United States Patent [19]

Robinson

[11] 4,114,843

[45] Sep. 19, 1978

[54] CONTROL STICK ASSEMBLY

[75] Inventor: Frank D. Robinson, Rancho Palos Verdes, Calif.

[73] Assignee: Robinson Helicopter Co., Torrance, Calif.

[21] Appl. No.: 729,161

[22] Filed: Oct. 4, 1976

[51] Int. Cl.[2] .............................................. B64C 13/12

[52] U.S. Cl. ........................................ 244/84; 74/492; 74/543; 244/83 F; 180/77 C

[58] Field of Search ................. 244/83 R, 83 B, 83 C, 244/83 F, 89, 229; 74/480 R, 484 R, 488, 491, 494, 543, 551.1, 551.3, 99 R, 492; 180/78, 77 C, 77 HT

[56] References Cited

U.S. PATENT DOCUMENTS

| | | | |
|---|---|---|---|
| D. 135,167 | 3/1943 | Obszarny et al. | 244/83 F |
| 792,573 | 6/1905 | Duryea | 180/78 |
| 1,798,724 | 3/1931 | Chalmers | 244/83 F |
| 1,807,939 | 6/1931 | Sikorsky | 244/84 |
| 1,855,988 | 4/1932 | Ranasey | 244/83 B |
| 3,228,478 | 1/1966 | Edenborough | 244/83 F |
| 3,271,045 | 9/1966 | Vacante | 180/77 C |
| 3,994,453 | 11/1976 | Firestone | 244/122 R |

FOREIGN PATENT DOCUMENTS

| | | | |
|---|---|---|---|
| 471,583 | 9/1937 | United Kingdom | 244/84 |

*Primary Examiner*—Galen L. Barefoot
*Attorney, Agent, or Firm*—Smyth, Pavitt, Siegemund, Jones & Martella

[57] ABSTRACT

A control stick assembly for dual control of aircraft includes a single control stick for longitudinal and lateral orientation of the aircraft. The stick is mounted on the center of the aircraft by a joint permitting lateral and longitudinal movement by a crossbar mounted on the stick. The crossbar is hinged vertically above the joint and is tiltable freely in a vertical plane. Grips are mounted on crossbar and located in front of each of the pilot and copilot so that each may control the aircraft through a single stick. The stick is connected to appropriate linkages to move the ailerons and elevator of an airplane or the rotor blades of a helicopter.

10 Claims, 4 Drawing Figures

FIG. 1
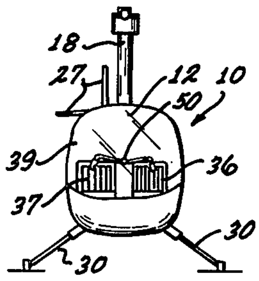
FIG. 2
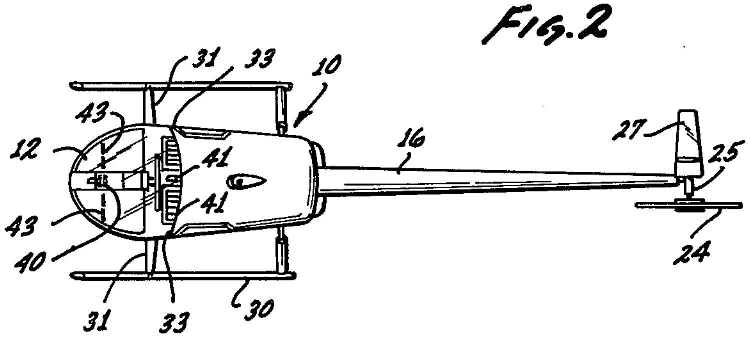
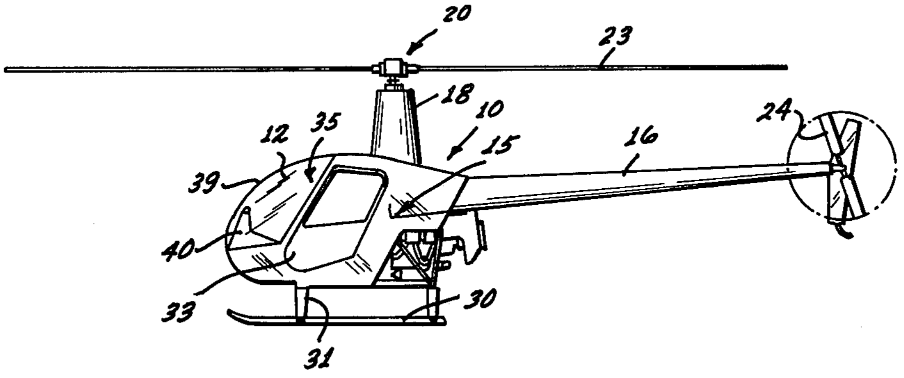
FIG. 3
FIG. 4
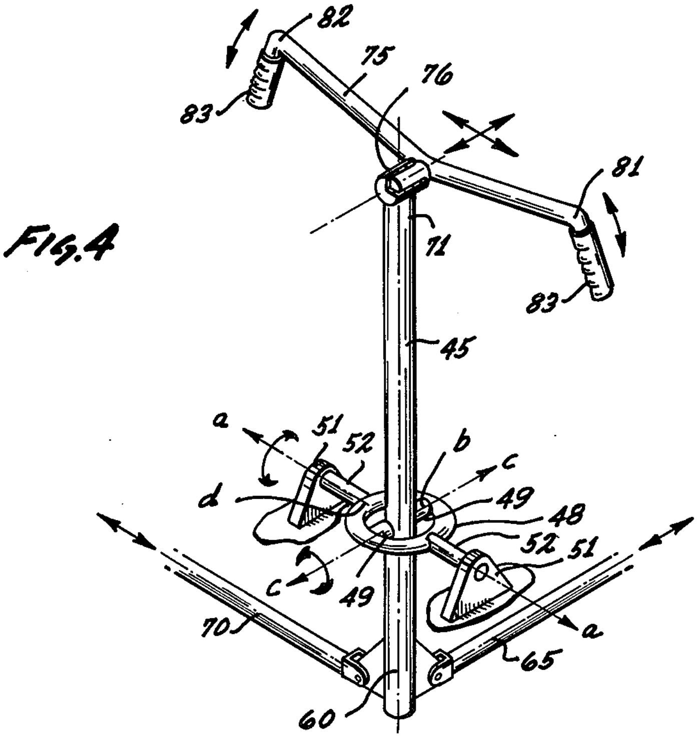

CONTROL STICK ASSEMBLY

BACKGROUND OF THE INVENTION

This invention relates to a control stick assembly for aircraft and more particularly to an improved assembly utilizing a single stick to provide for dual control of an aircraft.

PRIOR ART

Conventional control assemblies for lateral and longitudinal control of an aircraft operate by controlling the ailerons and elevator of an airplane or by controlling the cyclic pitch of the rotor of a helicopter. Normally, the control stick is located in front of the pilot and positioned between the pilot's knees. In a dual control aircraft, a separate stick is provided for each of the pilot and copilot.

In relatively small aircraft of dual control variety and which are intended to be relatively inexpensive, a complex and somewhat expensive mechanism is required to interconnect the two control sticks so that they move together in the longitudinal and lateral directions. Since the control stick is usually located between the pilot's knees, the pilot must climb over the stick when entering or leaving the aircraft. In the case of relatively small aircraft, this can be inconvenient, especially if the pilot or copilot is a lady wearing a dress.

Additionally, dual control aircraft usually have two sets of floor pedals so that the pilot sits with the stick between the knees and the feet aligned with or on the floor pedals. In this type of arrangement, the lateral movement of the stick is limited by the space between the pilot's knees, having in mind that the feet are on the pedals.

SUMMARY OF THE INVENTION

By the present invention, the difficulties of the prior art dual control system are overcome while providing the advantages of a dual control system.

Thus, the present invention utilizes a single control stick located near the center of the aircraft and between the pilot and copilot seats. The stick is mounted to the aircraft structure by a joint which permits lateral and longitudinal movement of the stick but which prevents twisting around the vertical axis of the stick.

Attached at one free end of the stick are conventional linkages and the like for movement of the control surfaces of the aircraft, such as ailerons and elevator of an airplane, or the cyclic pitch of the rotor of a helicopter. The other end of the stick has a crossbar mounted on it by a hinge which permits the crossbar to tilt freely in a vertical plane but not about a vertical axis.

Attached to each end of the crossbar is a pilot's grip such that each grip is located directly in front of the seat and attached to the control stick by the crossbar.

Each of the pilot or copilot may move the stick by manipulation of the grip much in the same fashion as if the control stick was located forward of each seat. The motion of the grip is transferred to the control stick by the crossbar and from the stick to those airfoils controlling longitudinal and lateral orientation of the aircraft.

The hinge is a free hinge and as the pilot or copilot moves the grip laterally, the free hinge allows the crossbar to move horizontally without tilting while moving the stick laterally. To the pilot or copilot movement of the grip feels the same as though a stick were located in the position of the grip and in front of the pilot and copilot. Longitudinal movement of the grip effects longitudinal movement of the stick and again feels basically as though the pilot or copilot were moving a stick located between the legs.

The advantages of the control stick assembly of this invention are several. Dual controls are provided while maintaining the simplicity of a single control. This is especially advantageous for small aircraft intended to be inexpensive. There is convenient entry and egress from the seats simply by tilting the control stick and the crossbar out of the way. Functionally, the system of this invention provides greater lateral control travel since the grip on the crossbar easily passes over the knees and control stick movement is not restricted to the space between the knees.

One of the significant advantages is greater pilot comfort and flying precision since the hinge on the crossbar allows the pilot to move the grip freely in the vertical direction without altering the stick setting. Thus, the pilot may move the crossbar around the hinge axis by moving the grip vertically enabling one to bring the grip down and to rest the forearm against the leg during flight.

These and other advantages will be apparent from the following detailed description and it will be apparent therefrom that modification, changes and variants may be made within the scope of the appended claims.

BRIEF DESCRIPTION OF THE DRAWINGS

FIG. 1 is a front view of a helicopter embodying the improved control stick assembly of this invention;

FIG. 2 is a plan view of the helicopter shown in FIG. 1;

FIG. 3 is a side view of the helicopter of FIG. 1; and

FIG. 4 is a diagrammatic view, in perspective, of the improved control stick assembly of the present invention.

DETAILED DESCRIPTION OF PREFERRED EMBODIMENT

Referring to the drawings which illustrate a preferred form of the present invention, the improved control stick assembly will be discussed with reference to a helicopter, although it is understood that the present invention may be used for lateral and longitudinal control of any aircraft, e.g. helicopter or airplane.

As shown in FIGS. 1-3 the aircraft in the form of a helicopter 10 includes a fuselage which houses an engine, fuel tank, main gear box, belt driven clutch, all located to the rear of the cockpit 12 in an area generally designated 15. Extending from the rear is tail boom assembly 16 while the rotor mast 18 extends above the fuselage as shown. The rotor mast encloses the main rotor control rods and drive shaft while the tail boom has the tail rotor drive shaft passing through it.

Above the rotor mast is the main rotor head and underslung hub generally designated 20. The hub has a two blade teetering rotor 23 affixed thereto, while the tail rotor shaft is attached to a two blade tail rotor 24 through a tail rotor gear box 25. The tail rotor is mounted opposite a tail assembly 27.

The fuselage is supported off the ground by a landing gear in the form of a landing skid track 30, the forward leg 31 of the skid track being below the doors 33 which provide for entry and egress from the cockpit 35.

Located in the cockpit are dual spaced seats 36, 37 arranged on each side of the center line of the aircraft. The forward portion of the cockpit is covered by a curved clear acrylic windshield 39, as shown, so there is excellent visibility through the windshield and doors. Forward of the seats and in the center of the aircraft is an engine and flight instrument panel 40, each seat being provided with a collective control 41 to the left and floor pedals 43 for rudder control. The collective control each includes conventional throttle twist grips.

Located forward of the seats and aft of the engine and flight panel 40 is the improved control stick assembly of the present invention.

Referring to FIG. 4, the improved control stick assembly 50 includes a single control stick 45 mounted on the aircraft by a joint 47 which permits the stick 45 to move in a lateral direction indicated by the arrows *a—a* about axis *b*, and for movement in a longitudinal direction indicated by the arrows *c—c*, about axis *d*.

In the form shown, the stick is mounted on a gimbal ring 48 by pins 49 so that the stick may rotate in a direction *a—a* about the axis *b*. The gimbal ring 48 is in turn mounted to a structural component of the aircraft, indicated as 51 through pins 52 such that the ring pivots about axis *d* as the stick is moved in a direction *c—c*. For this reason, the ring is free to tilt about axis *d* which may be accomplished by a rotating joint either at the ring or connection between pins 52 and the structural component 51.

The joint is preferably mounted beneath the aircraft floor such that the lower portion 60 of the stick extending beneath the joint is below the floor. As will be seen, movement of the stick in one direction causes the lower portion 60 to move in the opposite direction. Attached pivotally to the lower portion 60 of the stick are suitable linkages 65 and 70, the former connected to the elevator of an airplane or to linkages and the like, well known, to tilt the swash plate of the helicopter rotor drive assembly in a fore and aft direction. Linkage 70 is connected to the ailerons of an airplane or to linkages and the like, well known, to tilt the swash plate of the helicopter rotor drive assembly in a lateral direction.

The fore and aft and lateral movement of the swash plate effects a differential pitch (axis of rotation) change of the rotor of the helicopter to bank right or left, or pitch nose up or nose down, whereas the collective sticks 33 effect a change in angle of attack of both rotor blades causing the aircraft to go up or down.

To the upper end 71 of the stick 45 a crossbar 75 is attached through a free hinge 76 which permits the crossbar 75 to tilt freely in a vertical plane, but not about the vertical axis. The stick itself likewise cannot twist about the vertical axis. The hinge 76 is formed by a socket 78 found at the upper end 71 of the stick and a pin provided at the center of the crossbar and received for free rotation in the socket.

To each of the ends 81 and 82 there is attached a pilot's grip 83, the crossbar 75 being configured such that the intersection of the ends 81 and 82 and the crossbar is raised slightly above the hinge 76, as can be seen in FIG. 4 and in FIG. 1. The ends 81 and 82 are also displaced rearwardly away from the stick and towards the seats as seen in FIG. 4 and FIG. 3.

The stick is preferably located along the center line of the aircraft (FIG. 2) so that the grips 83 are forward of and centered with respect to the seats 36, 37 (FIG. 1).

In operation, the pilot moves the grip much in the same fashion as though there were dual control sticks. The motion of the grip is transferred to the stick 45 by the crossbar 75 and to the appropriate control elements through linkages 65 and 70. When the grip is moved laterally, the free hinge 76 allows the grip and the crossbar to move horizontally without tilting and the motion and feel to the pilot is the same as if the control stick was directly in front of the pilot.

As seen from FIGS. 1 and 2, the improved control assembly of the present invention finds particular use in relatively small aircraft in which the pilot and copilot seats are arranged in side-by-side relationship on each side of the center axis of the aircraft. In effect, the improved control assembly of the present invention provides dual control capabilities while maintaining the mechanical simplicity of a single stick control. From a practical standpoint, there are also advantages in entry or egress from the pilot's seat. As seen in FIGS. 1 and 3, it is possible to enter and exit the aircraft by merely tilting the control stick and crossbar out of the way, entering the aircraft and then tilting and moving the crossbar in the other direction for entry of the second individual. Another significant advantage is greater lateral control travel since the grip is free to pass over the pilot's knees and is not restricted to the space between the pilot's knees. This is readily apparent from the foregoing description and an examination of FIGS. 1 and 2 of this application.

In flight, the control system of the present invention also provides greater pilot comfort and flying precision since the crossbar hinge 76 allows the pilot to move the control grip 83 freely in a vertical direction, that is, up and down, and this enables the pilot to bring the grip down and to rest the forearm on the leg. The above movements of the grip and control stick have been described without reference to the position of the pilot's feet which are normally aligned with or resting on the pedals 43 located forward of the stick and on the cabin floor. Since the pedals normally arranged side-by-side, one to be operated by the left foot and the other to be operated by the right foot, large movements to the left or right of the control stick of the present invention are easily accomplished because there is no control stick between the pilot's knees and the grip may be moved above the knees to effect movement of the stick in a right or left, that is lateral orientation.

The system of the present invention which provides a dual control capability through a single stick has particular advantages in dual controlled aircraft which are intended to be relatively small, relatively inexpensive, and relatively simple from a mechanical standpoint. As will be appreciated, dual linkage assemblies add to the weight of the aircraft and to its size. Thus, a relatively simple mechanical structure which provides dual control capabilities in a dual seat aircraft has advantages from that standpoint.

To illustrate, the helicopter shown in FIGS. 1–3 of this application has a performance specification as shown in the following table.

| PRELIMINARY R-22 HELICOPTER SPECIFICATIONS | |
|---|---|
| Main rotor dia. | 25.17 ft. |
| Disk area | 497.4 sq. ft. |
| Disk loading at 1,230 lb. gross weight | 2.473 psf. |
| Rotor solidity | 030 |
| Blade twist | −8 deg. |
| Flapping angle to stops | ±12 deg. minimum |
| Tip speed at 2,800 engine rpm | 672 fps. |
| Tail rotor dia. | .42 in. |
| Powerplant make & model | Lycoming O-235-C2C |
| Rating (takeoff or continuous | 115 hp. at 2,800 rpm. |
| Gross weight | 1,230 lb. |
| Empty weight | 720 lb. |

-continued

| PRELIMINARY R-22 HELICOPTER SPECIFICATIONS | |
|---|---|
| Fuel weight (17 gal.) and oil | 114 lb. |
| Payload | 396 lb. |
| $V_{NE}$ | 115 mph. |
| Maneuvering load factor | +3.5 −0.5 |
| Landing load factor | +3.5 (landing gear + rotor) |
| Maximum rotor tilt | 12 deg. relative to shaft |
| Performance at Gross Weight: | |
| Cruise airspeed at 75% power and s.l. | 100 mph. |
| Fuel consumption at economy cruise | 15 mpg. |
| Approximate range (no reserve) | 250 mi. |
| Rate of climb at sea level | 1,500 ft./min. |
| Service ceiling | 14,000 ft. |
| Hover ceiling (out of ground effect) | 5,200 ft. |
| Hover ceiling (in ground effect) | 6,500 ft. |

It is possible to use a power plant which is a high performance power plant, for example, a Lycoming O-320 (four cylinder opposed engine rated at 150 horsepower at 2700 rpm at sea level).

The helicopter shown herein has an overall height of 8 feet 9 inches, an overall width including the skids of 6 feet 5 inches, and an overall length including the rotors of 28 feet 9 inches. The cabin heighth is 5 feet 8 inches with a width of 3 feet 8 inches. Thus, it can be seen that the unit is a relatively small, compact aircraft which provides dual control from either the pilot or copilot seat by a relatively simple control mechanism.

It will be apparent to those skilled in the art that various modifications and changes may be made without departing from the scope of the appended claims.

I claim:

1. In a dual control aircraft movable in a lateral and longitudinal direction and having airfoil surfaces to effect lateral and longitudinal orientation of the aircraft, and wherein the aircraft is provided with side-by-side pilot and copilot seats arranged on each side of the center axis of the aircraft, the improvement comprising a single non-rotatable control stick for lateral and longitudinal orientation of the aircraft, said stick being located generally on the center axis of the aircraft, means forming a joint for mounting said stick for pivotal movement in a lateral and longitudinal direction, crossbar means hingedly mounted on said stick vertically above said joint whereby said crossbar is tiltable freely in a vertical plane without effecting aircraft orientation, means connected to said stick to effect movement of said airfoil surfaces for lateral and longitudinal orientation of the aircraft in response to lateral and longitudinal movement of said control stick, and spaced grip means mounted on said crossbar and, in a centered position of said control stick, being located forward of and generally centered in front of each of said seats whereby either the pilot or copilot may control lateral and longitudinal orientation of the aircraft through movement of said single control stick.

2. In a dual control aircraft as set forth in claim 1 wherein said airfoil surfaces are operative to control the lateral and longitudinal orientation of a helicopter.

3. In a dual control aircraft as set forth in claim 1 wherein said airfoil surfaces are the rotor blades of a helicopter.

4. In a dual control aircraft as set forth in claim 1 wherein said grip means is inclined with respect to said control stick.

5. In a dual control aircraft as set forth in claim 1 wherein said means connected to said stick are positioned vertically below said joint.

6. In a dual control aircraft as set forth in claim 1 wherein said crossbar includes spaced ends located vertically above said stick and between said stick and said seats.

7. In a dual control aircraft as set forth in claim 3 wherein said means connected to said stick effects a differential tilt to said rotor blades to control lateral and longitudinal orientation of the aircraft.

8. In a dual control aircraft as set forth in claim 3 wherein said stick includes a hinge socket vertically above said joint, and said crossbar including a hinge pin received within said hinge socket for rotation of said crossbar around the axis of said hinge pin.

9. In a dual control aircraft as set forth in claim 1 wherein said stick includes a hinge on one end thereof, the axis of said hinge being vertically above said joint and being in the same plane as the axis of lateral movement of said stick in said joint.

10. In a dual control aircraft as set forth in claim 3, wherein movement of said stick through the crossbar effects movement of the portion of the stick above the joint in one direction and results in movement of the portion of the stick below the joint in an opposite direction.

* * * * *